United States Patent [19]
Martinez

[11] 3,774,878
[45] Nov. 27, 1973

[54] VALVE ASSEMBLY

[76] Inventor: Sylvia Martinez, 1111 Pizarro St., Coral Gables, Fla. 33134

[22] Filed: Nov. 8, 1971

[21] Appl. No.: 196,354

[52] U.S. Cl. .............................. 251/65, 251/250
[51] Int. Cl. ............................................ F16k 31/08
[58] Field of Search .............................. 251/65, 250

[56] References Cited
UNITED STATES PATENTS

| | | | |
|---|---|---|---|
| 2,536,813 | 1/1951 | Jones et al. | 251/65 |
| 2,307,723 | 1/1943 | Anderson | 251/65 X |
| 3,118,647 | 1/1964 | Hasty | 251/65 |
| 1,758,105 | 5/1930 | French | 251/65 |
| 2,346,904 | 4/1944 | Carlson | 251/65 |

Primary Examiner—Arnold Rosenthal
Attorney—Harvey B. Jacobson

[57] ABSTRACT

A magnetically operated valve assembly for laboratory use and the like, said assembly comprising a housing with fluid connectors extending therefrom, a valve member with a permanent magnet affixed thereto for movement between a plurality of positions, and an adjustment knob operatively connected to a magnetic actuator for selectively positioning the valve member at a desired setting to control the rate of fluid flow and droplet size.

9 Claims, 6 Drawing Figures

PATENTED NOV 27 1973
3,774,878
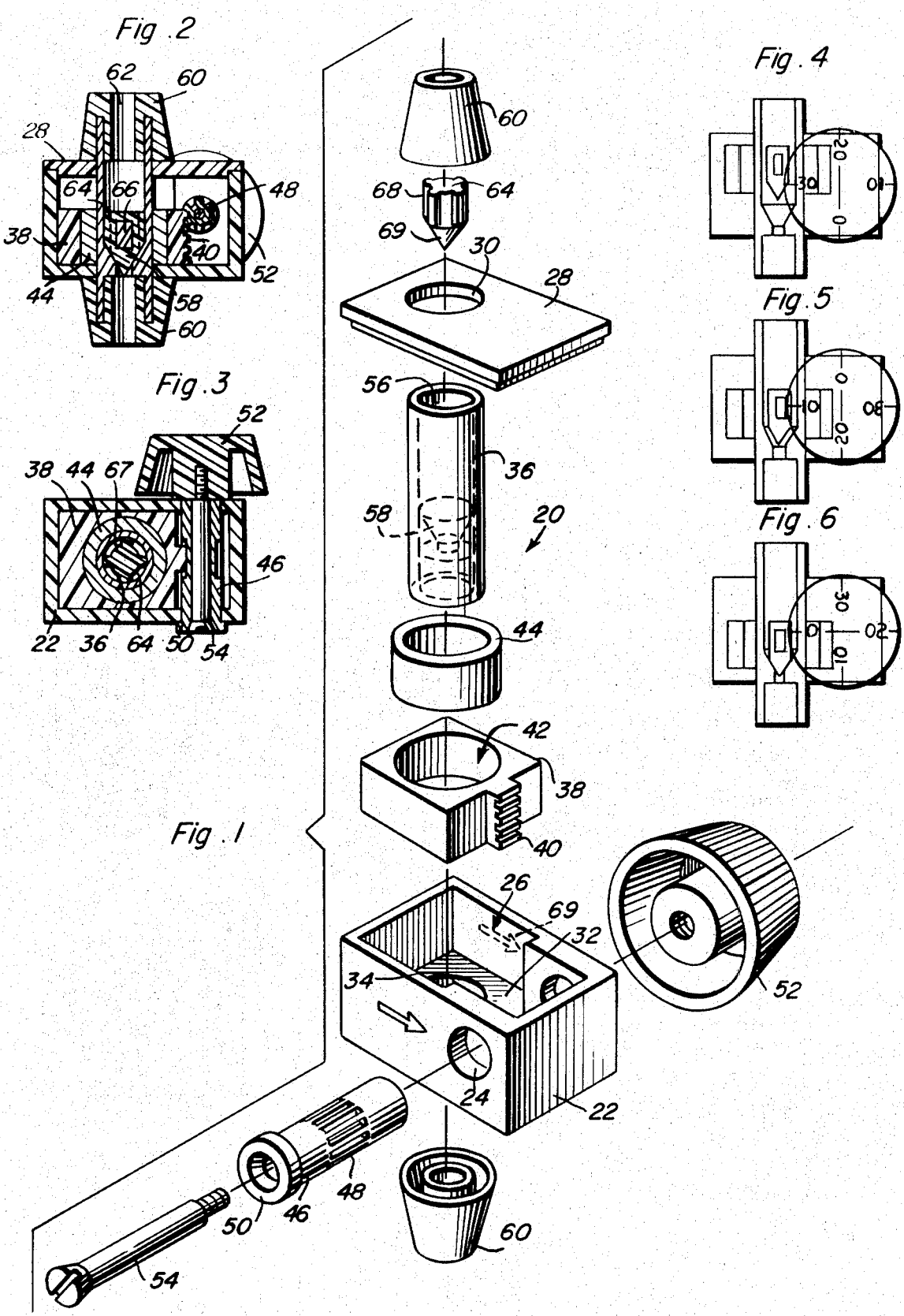

VALVE ASSEMBLY

The present invention is generally related to flow control valves and, more particularly, to laboratory flow controls requiring precise flow rate and control of droplet size.

In the past, various dispensing valves have been provided for handling laboratory chemicals, such as acids, and the like. Such conventional constructions, however, were found to be unsatisfactory either because the moving components were not isolated from the fluid flow and were adversely affected by chemical action over a period of time. or the rate of flow or droplet size could not be precisely controlled within tolerable limits to duplicate previous laboratory experiments or procedures. While valve assemblies have been proposed to overcome these objections, such have been relatively complex in nature, difficult to disassemble, and expensive to manufacture.

It is an object of the present invention to provide a novel valve assembly, including a magnetic actuator which is isolated from the chemical fluid flow and, thereby unimpaired by chemical action even after long periods of use.

Another object of the present invention is to provide a versatile valve assembly including a valve adjustment knob coupled to a magnetic actuator with indicia on the knob to provide precise settings and control of the rate of fluid flow and droplet size, thereby permitting accurate duplication of previous laboratory experiments and procedures.

It is a further object of the present invention to provide a unique valve assembly made of plastic materials, such as polyethylene, polypropylene or teflon, which are chemically inert and which may be easily cleaned in the event that such is necessary.

Still another object of the present invention is to provide a versatile valve assembly comprising a plastic housing, fluid-handling member, and resilient couplings which are snap fitted together to provide a structure which is durable, long lasting and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an exploded perspective view of the valve assembly of the present invention.

FIG. 2 is a sectional elevation of the valve assembly shown in FIG. 1.

FIG. 3 is a plan sectional view of the valve assembly shown in FIG. 1.

FIGS. 4–6 are simplified illustrations of typical valve settings provided by the valve assembly shown in FIG. 1.

Referring now, more particularly, to FIGS. 1–3, the valve assembly of the present invention is illustrated and is generally indicated by the numeral 20. The assembly includes a generally rectangular housing 22 with a pair of transversely aligned holes 24 communicating with a hollow interior or chamber 26. The housing is provided with a rectangular top cover 28 with an aperture 30 formed therein. A similarly shaped integral bottom panel 32 is provided and includes an aperture 34 adapted to align with aperture 30 to receive a cylindrical fluid-carrying tubular member 36.

Preferably, the valve assembly housing and top cover are held together by way of a snug snap fit, the pieces being formed of plastic materials, which are inert to most chemicals encountered in laboratory experiments and procedures. The interior chamber 26 of housing 22 is adapted to slidably receive a mounting block or rack member 38 having a plurality of vertically extending rack teeth 40 and a centrally located mounting hole 42. Preferably, rack 38 is mode of plastic materials similar to those of housing 22 and is adapted to carry an annular actuation magnet 44 held in mounting hole 42 by way of a forced fit, cement, or similar fastening means.

The valve assembly is further provided with a cylindrical actuation member 46 rotatably mounted in housing holes 24 and including a plurality of pinion teeth 48 adapted to reciprocate mounting block 38 by way of rack teeth 40. The actuation member is held in place against axial movement by way of a collar or flange 50 at one end and the neck of an adjustment knob 52 engaging the actuating member at its opposite end. Knob 52 is held firmly in place by way of a mounting screw 54 extending axially through actuation member 46, such that rotation of the knob produces a corresponding rotation of the actuation member. It should be noted, that if desired, the actuation member and adjustment knob may be keyed or similarly engaged with each other to assure against slippage which could produce erroneous valve settings. Preferably, the knob may be mounted on either side of the housing by reversing actuation member 46.

Tubular member 36 is provided with a fluid passageway 56 extending axially therethrough and including a valve seat 58 which is frusto-conical in shape. The outer diameter of tubular member 36 is approximately the same as the holes 30 and 34, such that the tubular member is held snugly in place within the assembly housing 22. The length of tubular member 36 is such that its opposite ends extend beyond the assembly housing and are adapted to receive resilient couplings or fittings 60 with annular grooves formed therein adapted to snugly and retentively engage the ends of the tubular member, as best illustrated in FIG. 2. Preferably, each coupling is frusto-conical or cylindrical in shape and is provided with an axial bore 62 adapted to sealingly receive a fluid-carrying tube, such as that associated with a graduated pipette or burette. Thus, it will be appreciated that the resilient couplings 60 provide a convenient and inexpensive means of connecting fluid delivery and exhaust tubes to the valve assembly by merely plugging or pushing the tube into position. As such, a variety of laboratory set-ups may be easily and economically provided in a minimum amount of time to perform various experiments and procedures. Preferably, couplings 60 are formed of plastic materials which are inert to most laboratory chemicals. However, natural or synthetic rubber materials may be utilized, if desired.

The purpose of the valve assembly is to precisely control the rate of flow or droplet size of fluid chemicals being dispensed, such as those utilized in laboratory experimentation. This is achieved by way of a magnetic valve member 64 which is slidably mounted in fluid passageway 56 associated with tubular member 36.

Preferably, valve member 64 is formed of plastic materials with a permanent magnet 66 molded in its interior. The valve member is further provided with a plurality of longitudinally extending fins 68, the outermost surfaces of which engage the interior walls of fluid passageway 56, such that the valve member is held in position against tumbling within the fluid passageway, yet, is permitted to reciprocate therein under the influence of annular actuation magnet 44. With the fins engaging the interior walls of the fluid passageway, they define fluid carrying channels in the spaces therebetween, such that the fluid flow around the valve member is not significantly hampered.

Flow control is achieved by way of a conical portion 69 formed on the tip of the valve member and which is of a taper approximately the same as that of valve seat 58. It will be appreciated that the fluid flow through the valve assembly is restricted by the valve member when it is in engagement with valve seat 58. Rotation of adjustment knob 52 is effective to raise the actuation magnet and, thus, effect a corresponding vertical movement of valve member 64. The unseating of the valve member provides a relatively small area path for fluid flow through the channels and around the face of tapered tip 69 and through channels 67. As the valve member is moved vertically farther away from the valve seat, the flow area is increased, thereby effecting an increase in the rate of flow. Thus, for each valve member position, there is a corresponding flow rate and/or droplet size of fluid being dispensed through the valve assembly. By providing knob 52 with the indicia imprinted thereon, readings are provided which correspond to the valve member position and, thus, to the rate of fluid flow or droplet size. Preferably, housing 22 is provided with an indicating arrow, which cooperates with the indicia on the adjustment knob to precisely indicate its position.

Referring to FIGS. 4–6, the operation of the valve assembly may be seen in more detail. The adjustment knob is provided with indicia or markings, such as the numbers 0–30, as illustrated in the drawings. Preferably, the assembly is calibrated such that the valve member is in the fully closed position when the selection knob is at the 0 position. Rotation of the knob in a clockwise direction moves rack member 38 and the actuation magnet upward to a position corresponding to the dial indication. This provides extremely accurate settings of flow rate and droplet size which permits the accurate duplication of laboratory experiments and procedures not possible with conventional inexpensive valve assemblies.

From the foregoing descriptions, it will be appreciated that the valve assembly of the present invention provides a durable, long lasting flow control valve for laboratory use which is relatively inexpensive to manufacture. The use of plastics and snap-fittings permit convenient disassembly for cleaning and the like. Furthermore, the resilient tube couplings permit quick and easy connection to pipettes, burettes, or similar laboratory equipment. It will also be appreciated that the valve assembly of the present invention may be utilized in macro, micro and vacuum type laboratory procedures, the vacuum type requiring stronger magnets and closer tolerances for proper sealing. Of course, minor variations in the number or exact locations of the fluid handling ports, the magnets, or the component materials, housing configuration or selector knob connections are deemed to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A valve assembly comprising a hollow housing, a rack member reciprocally mounted in said housing, an actuation magnet carried by said rack member, a tubular fluid-carrying member supported by said housing and extending through said actuation magnet, said tubular member including an internal valve seat, a magnetic valve member reciprocally mounted in said tubular member and adapted to engage said valve seat under the influence of said actuation magnet, a pinion member rotatably mounted in said housing and operatively connected to said rack member for imparting movement thereto, and adjustment means for selectively rotating said pinion member to obtain a desired rate of fluid flow through said tubular member, said housing including a pair of aligned apertures, the opposite ends of said tubular member extending through and snugly engaging said pair of aligned apertures.

2. The structure set forth in claim 1 wherein said assembly includes resilient fittings with annular grooves in engagement with the ends of said tubular member and central bores communicating with the interior of said tubular member and being adapted to receive fluid-carrying tubes.

3. The structure set forth in claim 1 wherein said magnetic valve member includes a plurality of guide fins slidably engaging the interior walls of said tubular member and defining a plurality of fluid-carrying channels.

4. The structure set forth in claim 3 wherein said magnetic valve member includes a conical tip and said valve seat is of similar conical shape to provide a substantial seal when engaged by said conical tip.

5. The structure set forth in claim 2 wherein said housing, fittings, and tubular members are snugly snap-fitted together for convenient disassembly and cleaning.

6. A valve assembly comprising a hollow housing, a rack member reciprocally mounted in said housing, an actuation magnet carried by said rack member, a tubular fluid-carrying member supported by said housing and extending through said actuation magnet, said tubular member including an internal valve seat, a magnetic valve member reciprocally mounted in said tubular member and adapted to engage said valve seat under the influence of said actuation magnet, a pinion member rotatably mounted in said housing and operatively connected to said rack member for imparting movement thereto, and adjustment means for selectively rotating said pinion member to obtain a desired rate of fluid flow through said tubular member, said adjustment means including a knob connected to said pinion member, indicia associated with said knob to indicate the angular position thereof and the position of said magnetic valve member to accurately set the rate of flow and fluid droplet size.

7. The structure set forth in claim 6 wherein said actuation magnet is of annular configuration surrounding said tubular member.

8. The structure set forth in claim 6 wherein said knob is affixed directly to said pinion member for rotation therewith.

9. A valve assembly comprising: a hollow housing, a rack member reciprocally mounted in said housing, an actuation magnet carried by said rack member, an elongated tubular fluid-carrying member supported by said housing with a longitudinal axis extending through said actuation magnet, said tubular member including an internal valve seat, a magnetic valve member reciprocally mounted in said tubular member and adapted to engage said valve seat under the influence of said actuation magnet, a pinion member rotatably mounted in said housing for rotation about an axis perpendicular to the axis of said tubular member and engaging said rack member for imparting movement thereto parallel to said tubular axis, and adjustment means for selectively rotating said pinion member to obtain a desired rate of fluid flow through said tubular member, said rack member including an elongated row of spaced teeth extending parallel to said tubular axis and perpendicular to said rotational axis.

* * * * *